United States Patent [19]

Nishiyama et al.

[11] Patent Number: 5,568,250
[45] Date of Patent: Oct. 22, 1996

[54] APPARATUS AND METHOD FOR MEASURING THE VELOCITY OF A FLYING SPHERICAL OBJECT

[75] Inventors: Tetsuji Nishiyama, Akashi; Takashi Teraguchi, Kakogawa, both of Japan

[73] Assignee: Sumitomo Rubber Industries, Ltd., Kobe, Japan

[21] Appl. No.: 249,201

[22] Filed: May 26, 1994

[30] Foreign Application Priority Data

Jun. 7, 1993 [JP] Japan .................................. 5-164174

[51] Int. Cl.$^6$ .............................. G01D 3/36; A63B 67/00; A63B 61/00; A63B 55/00
[52] U.S. Cl. ......................... 356/28; 273/25; 273/29 R; 473/131; 473/190; 473/219
[58] Field of Search ................................. 356/28; 273/25, 273/29 R, 32 R, 181 H, 183.1, 213

[56] References Cited

U.S. PATENT DOCUMENTS

| | | | |
|---|---|---|---|
| 4,201,467 | 5/1980 | Hartman et al. ........................... | 356/28 |
| 4,437,672 | 3/1984 | Armantrout et al. ................ | 273/185 B |
| 4,542,906 | 9/1985 | Takase et al. ......................... | 273/181 H |
| 4,563,005 | 1/1986 | Hand et al. ........................... | 273/181 H |
| 4,814,986 | 3/1989 | Spielman ................................. | 273/29 A |
| 5,230,505 | 7/1993 | Paquet et al. ............................ | 273/26 A |
| 5,437,457 | 8/1995 | Churchod ............................... | 273/183.1 |

*Primary Examiner*—Stephen C. Buczinski
*Attorney, Agent, or Firm*—Armstrong, Westerman, Hattori, McLeland & Naughton

[57] ABSTRACT

An apparatus for measuring the flying velocity of a spherical object, including ray projecting devices for emitting a plurality of parallel rays of light, ray receiving devices for detecting the incidences of said rays of light on them and the interceptions of said rays of light, an instrumentation device for measuring the time for which said rays of light are blocked off by a spherical object in flight, upon detecting signals given by said ray receiving devices, and an arithmetic operation device, such as a computer. The parallel rays of light emitted by using the ray projecting devices are arranged within a plane, and their respective positions are known quantities. The distance between every two rays of light is set such as to be less than the radius of the spherical object. The arithmetic operation device is used to compute the flying velocity of the spherical object in flight on the basis of the locations of the rays of light which are blocked off, and the interception time of the rays of light which is measured by using the instrumentation device.

16 Claims, 5 Drawing Sheets

APPARATUS AND METHOD FOR MEASURING THE VELOCITY OF A FLYING SPHERICAL OBJECT

BACKGROUND OF THE INVENTION

1. Field of the Invention

The present invention relates to improvements in an apparatus and method for measuring a velocity of a flying spherical object.

2. Description of the Related Art

The following conventional method is available for measuring the velocity of a flying spherical object such as a golf ball, a tennis ball or the like.

A plurality of beam projecting and receiving systems for detecting beams of light respectively comprise a floodlight lamp and a light receiving means which are placed at predetermined intervals along an expected flying path area of a spherical object to be hit. Measurement is performed upon a difference between the beam cut-off timing of one beam projecting and receiving system and that of the other beam projecting and receiving system, and this difference is used together with the distance between the two beam projecting and receiving systems to determine the flying velocity of the spherical object in flight.

However, in the conventional method thus described, the measuring area is narrowly limited, and if the path of the spherical object is outside the expected flying path area thereof, the velocity thereof cannot be measured.

SUMMARY OF THE INVENTION

Therefore, it is an object of the present invention to provide an apparatus for measuring the velocity of a flying spherical object which can readily and infallibly measure the velocity of the flying spherical object regardless of the trajectory thereof, thereby overcoming the foregoing disadvantage or problem of the conventional method.

Also, it is another object of the present invention to provide for a method for measuring the velocity of a flying spherical object which can readily and infallibly measure the velocity of the flying spherical object regardless of the trajectory thereof.

BRIEF DESCRIPTION OF THE DRAWINGS

The present invention will be described with reference to the accompanying drawings, in which.

DETAILED DESCRIPTION OF THE PREFERRED EMBODIMENTS

Preferred embodiments of the measuring apparatus and method according to the present invention will be described in detail with reference to the accompanying drawings.

Figure 1:
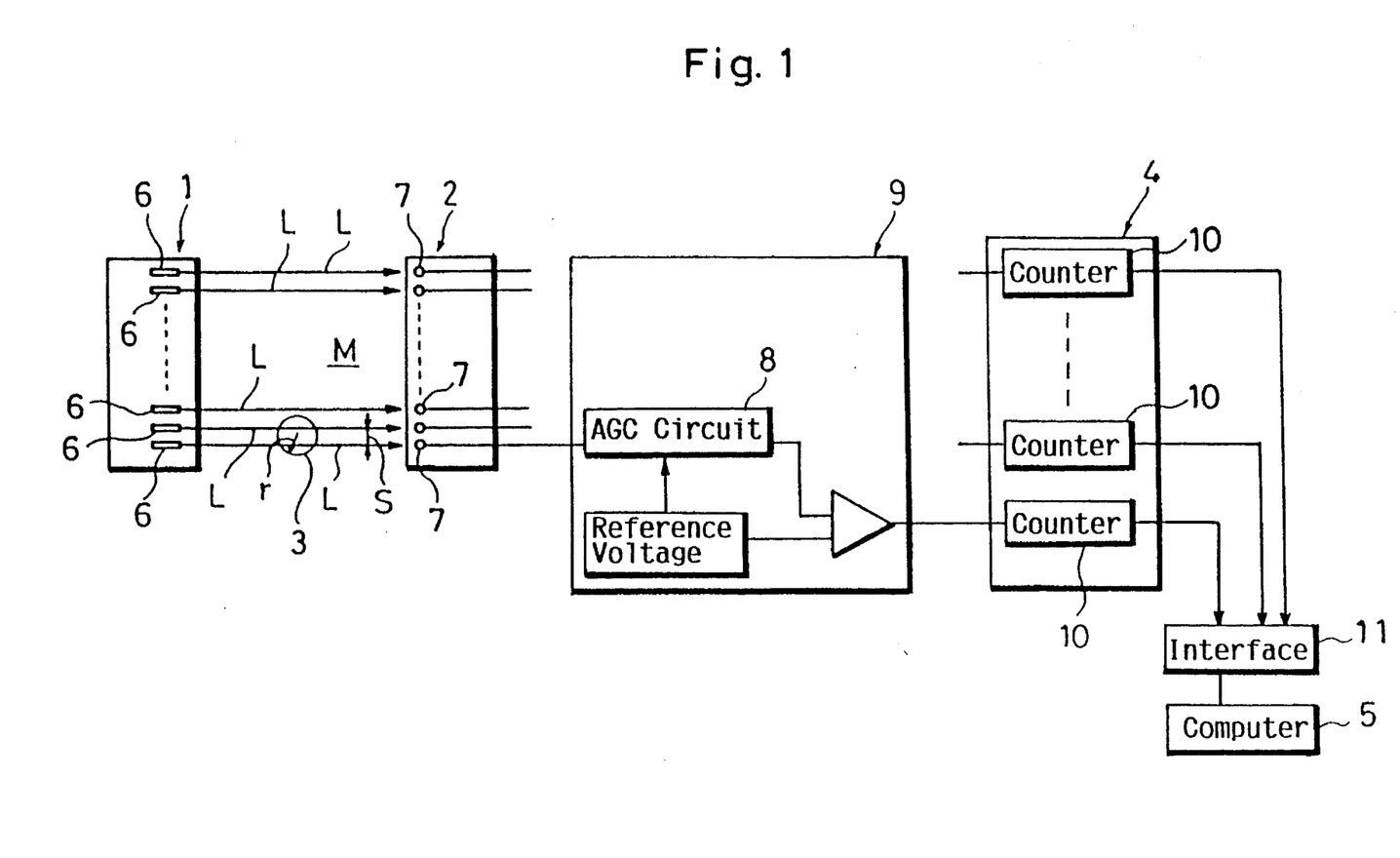
FIG. 1 is a diagram of the apparatus for measuring the velocity of a flying spherical object according to the present invention.

The measuring apparatus shown in FIG. 1 is provided with a ray projecting means 1 which emits a plurality of parallel rays L of light, a ray receiving means 2 which detects the incidence and blockage of the rays L of light, an instrumentation means 4 measuring the time for which a spherical object 3 blocks off the rays L of light, and a calculating means 5 for measuring the flying velocity of the spherical object 3 chiefly on the basis of the blockage or cut-off time of the rays L of light which is measured by means of the instrumentation means 4.

The ray projecting means 1 comprises semiconductor type laser markers 6 serving as the light sources which emit a plurality of, for example, sixteen rays L of light each consuming 10 mW of electric power thereof and having a wavelength of 670 nm. Such laser markers 6 are vertically arranged at regular intervals of, for example, 16 mm.

Figure 2:
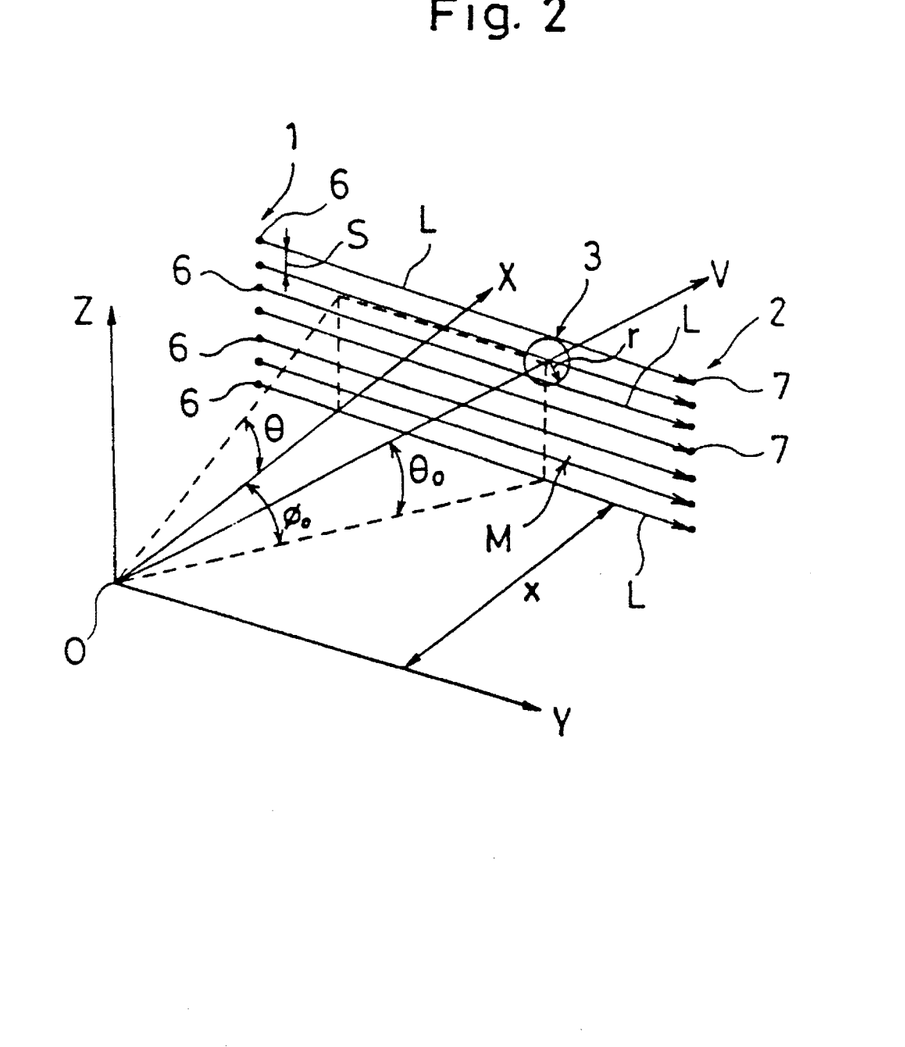
FIG. 2 is a conceptual diagram of the measuring system used in the apparatus shown in FIG. 1.

Referring to FIG. 2, the rays L of light emitted by means of the ray projecting means 1 are disposed on a single plane M (a vertical surface in the first preferred embodiment of the present invention). The plane M on which all the rays L of light are covered is determined in a predetermined position from a certain reference position. That is to say, the position on the plane M is a known quantity. For example, in FIG. 2, if the spherical object 3 is a golf ball, the distance x to the plane M from the golf ball teed up, namely, the shot point O is given such as 780 mm.

Also, the distance S between adjacent rays L of light is set such that it does not exceed the radius of the spherical object 3, to thereby meet the inequality S<r, or preferably S≦r× 0.95 or approximately 0.90. Therefore, the position of the each of rays L of light is a known quantity. That is to say, this position is determined in the X-coordinate system.

In the event that the distance S between every two neighboring rays L of light is set such as to be S<r, if the spherical object 3 passes through the plane M, it crosses at least two rays L of light.

The light receiving means 2 comprises photodiodes 7 vertically arranged at regular intervals of 16 mm in correspondence to the disposition of the laser markers 6 of the ray projecting means 1.

In front of the photodiodes 7 or on the side of the ray projecting means 1 there is provided a masking plate having sixteen holes each having a diameter of 1 mm thereof placed at regular intervals of 16 mm.

The output of each photodiode 7 is approximately 0 V unless a ray L of light is received.

An amplifier portion 9 shown in FIG. 1 is provided with sixteen AGC (Automatic Gain Control) circuits 8 which are respectively conformed to each of the sixteen photodiodes 7. This amplifier portion 9 performs automatic gain control to allow the photodiodes 7 to respectively have an output of approximately 2 V when the rays L of light are incident upon the photodiodes of the ray receiving means 2. This is to allow the AGC circuits to compensate for a decrease in the outputs of the rays L of light, which can be caused by, for example, aging of the laser systems of the markers 6 forming the ray projecting means 1. Also, the AGC circuits are arranged to be delayed in their responsiveness to the electric signals from the photodiodes 7 within the limits in which the measurement of the real blockage time of the rays L of light is not affected.

Figure 3:
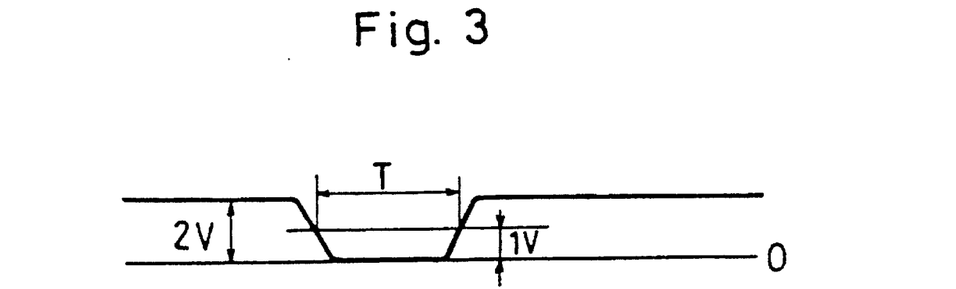
FIG. 3 is a waveform diagram of outputs of an amplifier portion which is one of the components forming the measuring apparatus according to the present invention.

The instrumentation means 4 measures the time T for which the output of the amplifier means 9 is below a predetermined value such as less than 1 V in FIG. 3, namely, the blockage time of the rays L of light. This instrumentation means 4 is provided with a plurality of (for example, sixteen) counters 10 to measure time for which the output of each AGC circuit 8 is less than 1 V, namely, the blockage time of the rays of light. The blockage time of the rays of light is inputted to a computer (an arithmetic operation means) 5 to detect a plurality of photodiodes 7 for which the rays L of light are blocked off.

The levels of the photodiodes 7, their spacings and other information are inputted in advance in the computer, to thereby measure a flying position of the spherical object 3 by using the following arithmetic operation method.

The flying velocity of the spherical object 3 is measured under the assumption that the spherical object 3 is a golf ball, the golf ball is hit, by using a golf club, from the position at which it is teed up, and the golf ball flies in the straight trajectory shown in FIG. 2.

In FIG. 2, the symbol $\theta_0$ represents a real launch angle of the golf ball (the angle formed by the horizontal line and the trajectory line V of the golf ball on a vertical surface including the trajectory line of the golf ball, namely, a vertical launch angle of the golf ball), the symbol $\Phi_0$ a real lateral deviation angle (a horizontal launch angle) of the golf ball, and the symbol $\theta$ a value of the real launch angle of the golf ball as projected on the plane XZ.

Figure 4:
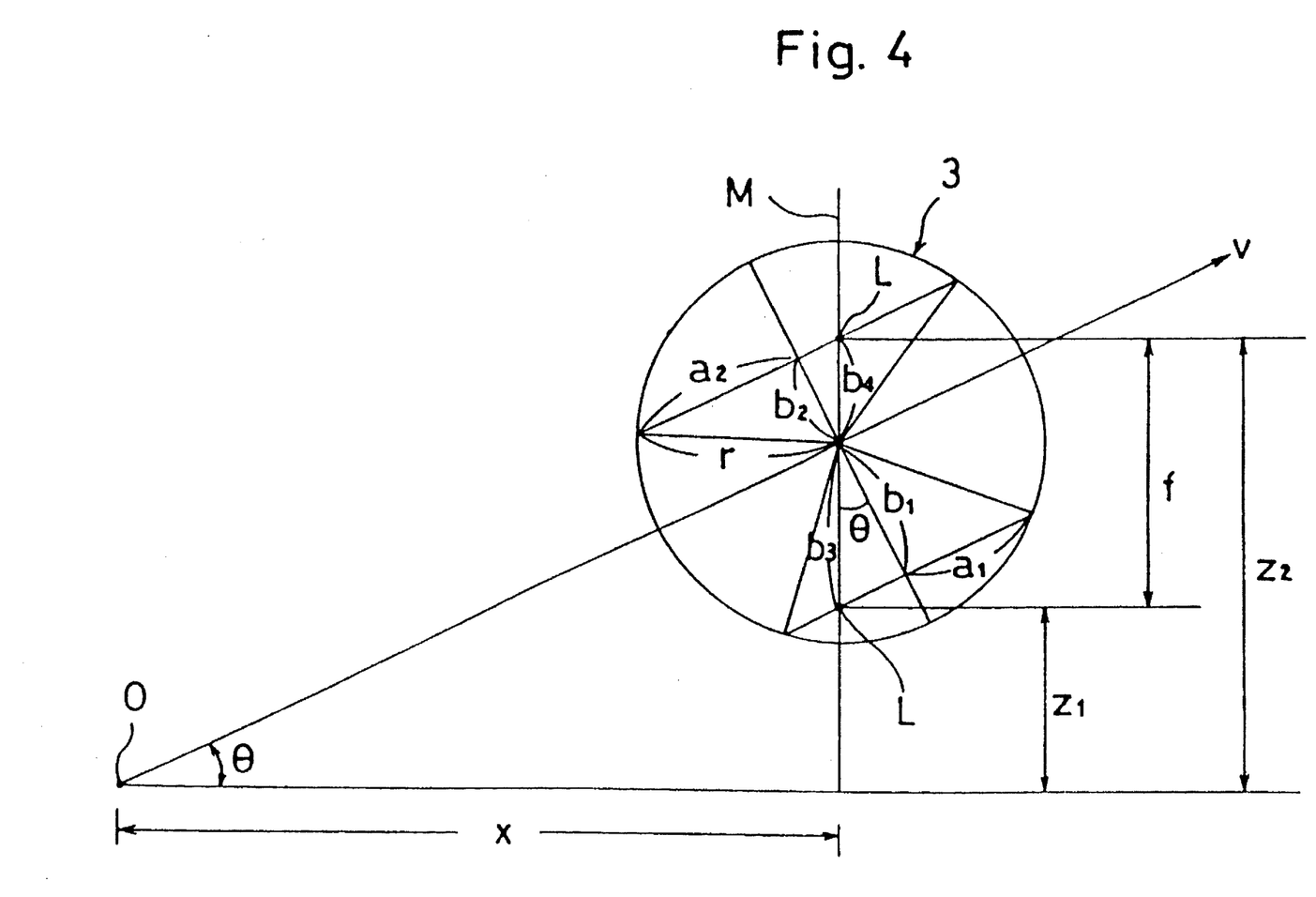
FIG. 4 is an explanatory diagram of a calculating method for the velocity of a flying spherical object, which is used in the measuring apparatus and method of the present invention.

In FIG. 4 which shows a conceptional view of the measuring system projected on the plane XZ, the symbol x denotes the distance (780 mm) from the tee, or the shot point O to the plane M including the rays L of light, the symbol $Z_1$ the level (35 mm) of the lowermost photodiode 7, the symbol $Z_2$ the level (51 mm) of the second photodiode, the symbol f the distance (16 mm) between every two photodiodes 7, the symbol r the radius (21.35 mm) of the golf ball, the symbol V the actual flying velocity of the golf ball, and the symbol v the flying velocity thereof into which the actual velocity V of the golf ball is projected on the plane XZ. Moreover, the symbol $t_1$ is used to represent the time for which the rays L of light are blocked off for the photodiode at a level of $Z_1$, and the symbol $t_2$ to represent the time for which the rays L of light are blocked off for the photodiode at a level of $Z_2$.

From the preceding conditions, the following eight formulae are obtained:

$a_1 = \frac{1}{2}vt_1$ $a_2 = \frac{1}{2}vt_2$ $a_1^2 + b_1^2 = r^2$ $a_2^2 + b_2^2 = r^2$ $b_3 + b_4 = f$ $b_1 = b_3 \cos\theta$ $b_2 = b_4 \cos\theta$ $\cos\theta = \dfrac{x}{\sqrt{x^2 + (z_1 + b_3)^2}}$ The foregoing eight equations results in the following formulae:

$$b_3 = \frac{-B \pm \sqrt{B^2 - AC}}{A}$$

in which, $A = (x^2 - r^2)(t_2^2 - t_1^2)$ $B = fx^2 t_1^2 + z_1 r^2(t_1^2 - t_2^2)$ $C = r^2(t_1^2 - t_2^2)(x^2 + z_1^2) - f^2 x^2 t_1^2$ As described in the foregoing, the symbols x, $z_1$, f and r are known quantities. Therefore, if the times $t_1$ and $t_2$ are measured, the flying velocity of the golf ball in flight is given by the following expression:

$$v = \frac{2a_1}{t_1} = \frac{2}{t_1}\sqrt{r^2 - b_1^2}$$
$$= \frac{2}{t_1}\sqrt{r^2 - b_3^2 \cos^2\left(\tan^{-1}\frac{z_1 + b_3}{x}\right)}$$

Figure 7:
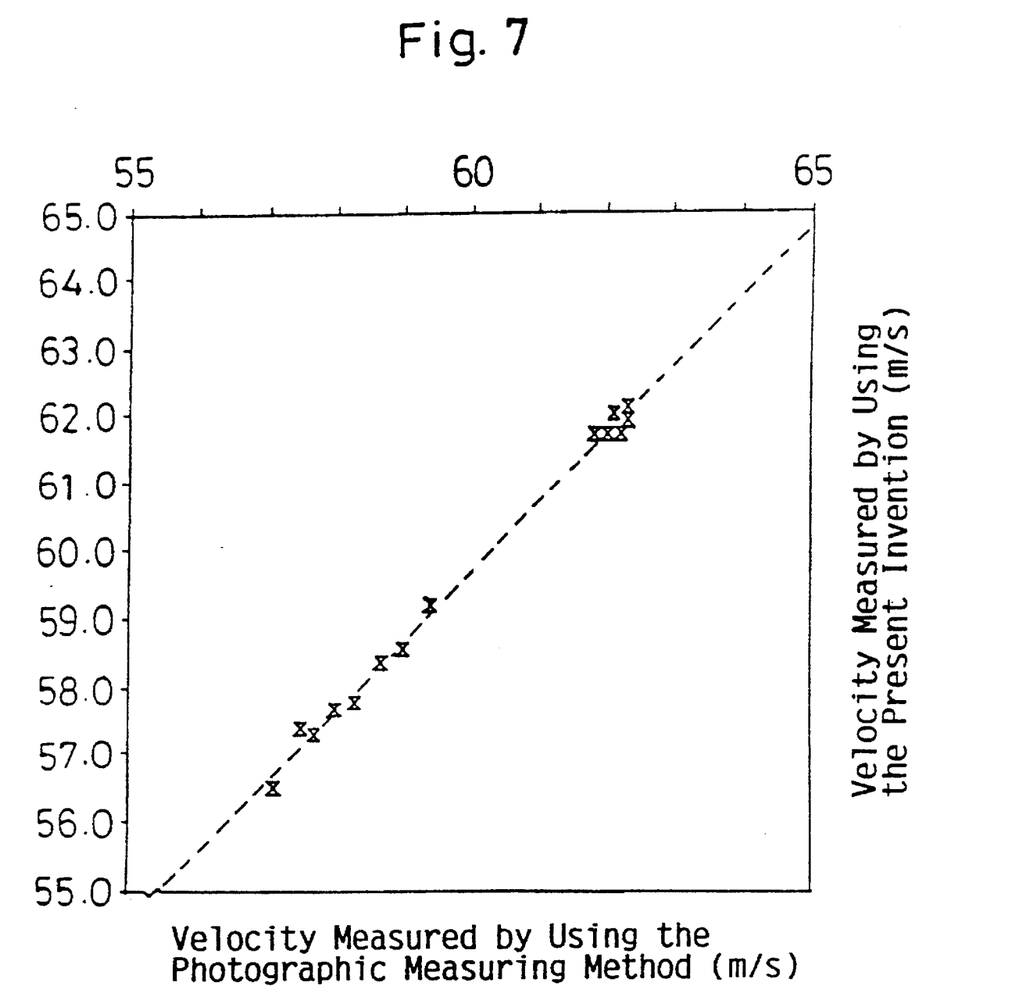
FIG. 7 is a graph which shows an interrelation between the velocities obtained by using the measuring method according to the present invention and those measured by a conventional photographic measuring method.

FIG. 7 is a graph (scatter diagram) which shows an interrelation between the flying velocities obtained by using the measuring method according to the preceding preferred embodiment of the present invention and those measured by the photographic measuring method, which is a conventional measuring method with a relatively high measuring accuracy.

In the photographic measuring method, a flashlight is emitted at intervals of 3 msec. two times, and two different images of a golf ball in flight are photographed in a single film frame which coincides in the vertical direction thereof with the normal direction of the ball. The centers of these two different images of the ball are found from a great number of points as voluntarily selected on their outer circumferential surfaces. The distance between the centers of the two ball images which are thus found are converted into actual length by using a calibration value obtained in advance, and the flying velocity of the ball is determined from the interval of time at which the flashlight is emitted.

The measuring method according to the present invention was used to measure the velocities v of flying objects (golf balls) 3, and the results of the measurement are shown in Table 1. In this measurement, fourteen golf balls teed up were hit by using a golf club.

TABLE 1

FLYING VELOCITY OF GOLF BALLS AS MEASURED BY USING THE MEASURING METHOD ACCORDING TO THE PRESENT INVENTION

| | Locations at which and Time (micro sec.) for which the Rays of Light are Blocked Off | | | | | | Flying Velocity of Golf Balls v | | | | |
|---|---|---|---|---|---|---|---|---|---|---|---|
| | (1) | | (2) | | (3) | | (1); (2) | (2); (3) | (3); (1) | Ave. (A) | R |
| 1 | 8 | 582.8 | 9 | 715.1 | 10 | 335.7 | 59.10 | 59.02 | 59.46 | 59.19 | 0.44 |
| 2 | 9 | 409.6 | 10 | 690.2 | 11 | 523.2 | 61.69 | 61.69 | 61.72 | 61.70 | 0.03 |
| 3 | 9 | 498.8 | 10 | 689.0 | 11 | 440.6 | 61.92 | 61.93 | 61.85 | 61.90 | 0.08 |
| 4 | 7 | 664.5 | 8 | 693.5 | — | — | 58.36 | — | — | 58.36 | — |
| 5 | 4 | 698.2 | 5 | 682.4 | — | — | 57.39 | — | — | 57.39 | — |
| 6 | 1 | 276.9 | 2 | 741.2 | 3 | 625.1 | 56.64 | 56.59 | 56.39 | 56.54 | 0.25 |
| 7 | 5 | 709.6 | 6 | 671.4 | — | — | 57.26 | — | — | 57.26 | — |
| 8 | 5 | 243.7 | 6 | 722.3 | 7 | 628.2 | 57.89 | 57.75 | 57.35 | 57.66 | 0.53 |
| 9 | 6 | 290.3 | 7 | 725.0 | 8 | 614.2 | 57.93 | 57.88 | 57.73 | 57.85 | 0.19 |
| 10 | 6 | 275.3 | 7 | 714.3 | 8 | 610.8 | 58.72 | 58.64 | 58.37 | 58.58 | 0.35 |
| 11 | 9 | 598.1 | 10 | 673.3 | 11 | 205.2 | 61.73 | 61.82 | 61.51 | 61.69 | 0.30 |
| 12 | 9 | 577.6 | 10 | 675.4 | 11 | 270.5 | 62.09 | 62.09 | 62.07 | 62.08 | 0.02 |
| 13 | 9 | 640.4 | 10 | 646.9 | — | — | 61.73 | — | — | 61.73 | — |
| 14 | 9 | 516.3 | 10 | 688.3 | 11 | 411.6 | 61.90 | 61.88 | 62.10 | 61.96 | 0.22 |
| N | | | | | | | | | | 14 | 10 |
| Ave. | | | | | | | | | | 59.56 | 0.241 |
| Min. | | | | | | | | | | 56.54 | 0.02 |
| Max. | | | | | | | | | | 62.08 | 0.53 |

TABLE 2

| | Flying Velocity as Measured by Using the Measuring Method according to the Present Invention, v | | Flying Velocity as Measured by Using the Photographic Measuring Method | Difference |
|---|---|---|---|---|
| | Average (A) | R | (B) | (A) − (B) |
| 1 | 59.19 | 0.44 | 59.42 | −0.23 |
| 2 | 61.70 | 0.03 | 61.82 | −0.12 |
| 3 | 61.90 | 0.08 | 62.30 | −0.40 |
| 4 | 58.36 | — | 58.73 | −0.37 |
| 5 | 57.39 | — | 57.45 | −0.06 |
| 6 | 56.54 | 0.25 | 57.13 | −0.59 |
| 7 | 57.26 | — | 57.68 | −0.42 |
| 8 | 57.66 | 0.53 | 58.02 | −0.36 |
| 9 | 57.85 | 0.19 | 58.30 | −0.45 |
| 10 | 58.58 | 0.35 | 59.04 | −0.46 |
| 11 | 61.69 | 0.30 | 62.01 | −0.32 |
| 12 | 62.08 | 0.02 | 62.29 | −0.21 |
| 13 | 61.73 | — | 62.15 | −0.42 |
| 14 | 61.96 | 0.22 | 62.12 | −0.16 |
| N | 14 | 10 | 14 | 14 |
| Ave. | 59.56 | 0.241 | 59.89 | −0.33 |
| Min. | 56.54 | 0.02 | 57.13 | −0.59 |
| Max. | 62.08 | 0.53 | 62.30 | −0.06 |

In Table 1, the locations at which the rays of light are blocked off are the levels of the rays L of light which are blocked off by the golf balls. The ray L of light emitted by means of the lowermost laser marker 6 is given the number 1 to show the location thereof, and the other rays of light emitted by the laser markers 6 which are placed at higher positions than the lowermost laser marker 6.

The level of each ray L of light is based on the central level of the golf ball teed up, and is given by the following formula:

$$\{(\text{Locational Number})-1\} \times 16 + 35 \text{ (in mm)}$$

As a result, No.1 ray L of light is 35 mm in the level thereof, No.2 ray L of light is 51 mm in the level thereof, the subsequent higher rays L of light are successively increased in their levels by 16 mm, and No.11 ray L of light is 195 mm in the level thereof.

Also, in Table 1, the numerals under the encircled numbers 1, 2 and 3 which belong to the column of "Locations at which and Time (micro second) for which the Rays of Light are Blocked Off" represent the locational numbers of the ray L of light which is blocked off. In the column of Table 1 which shows "Velocity", the numerals under the encircled numbers in pairs 1 ; 2, 2 ; 3 and 3 ; 1 respectively denote the flying velocity of the golf ball which is found from the rays L of light 1 and 2 as blocked off, from the rays L of light 2 and 3 as blocked off, and from the rays L of light 3 and 1 as blocked off.

In Table 1, there is also provided the column marked "R". This "R" column shows the difference between the maximum value and the minimum value of the flying velocity of each golf ball.

Also, Table 2 shows the differences between the flying velocities v of the golf balls which are found by using the measuring method according to the present invention and those of the golf balls which are given by the conventional photographic method.

It is to be understood from Table 2 that both the measuring method according to the present invention and the conventional photographic measuring method substantially the same flying velocity of the golf balls. That is to say, the measuring method according to the present invention allows easy measurement of the flying velocities of flying objects.

Figure 5:
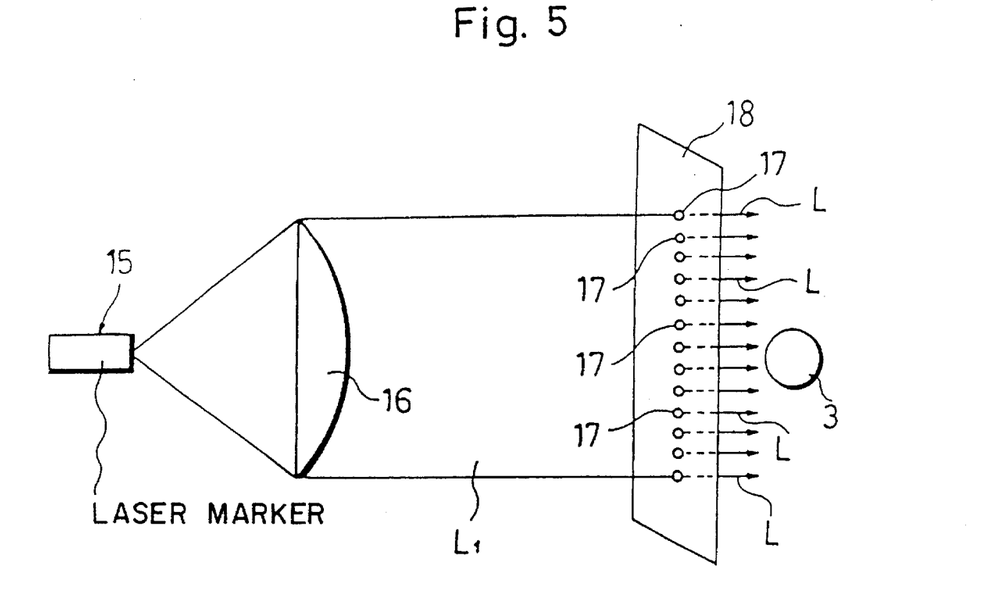
FIG. 5 is a schematic view of a principal portion of the measuring apparatus of the present invention according to a second preferred embodiment thereof.

FIG. 5 shows a second preferred embodiment of the measuring apparatus according to the present invention. This measuring apparatus comprises a modified type ray projecting means 1. This ray projecting means 1 is provided with a laser marker 15, a convex lens 16, and a masking plate member 18. The laser marker 15 is adapted to expand a semiconductor laser beam in a fan-shaped configuration by using a cylindrical lens. Also, the masking plate member 18 has a plurality of holes 17 vertically made therethrough at regular intervals of, for example, 16 mm.

The light source of the laser marker 15 is arranged to emit a semiconductor type laser beam having 40 mW power consumption and a 790 nm wavelength. The convex lens 16 is approximately 140 mm in the diameter thereof and has a focal length of approximately 300 mm.

With such an arrangement, the masking plate member 18 is allowed to have the parallel light band $L_1$ radiated thereto, whereby this parallel light band $L_1$ is incident upon the ray receiving means 2 through the holes 17 of the masking plate member 18 in the form of the ray L of light.

It will therefore be understood that the use of the modified type ray projecting means 1 achieves simple measurement of launch angles of flying golf balls as the employment of the measuring apparatus described in the foregoing and shown in FIG. 1.

Figure 6:
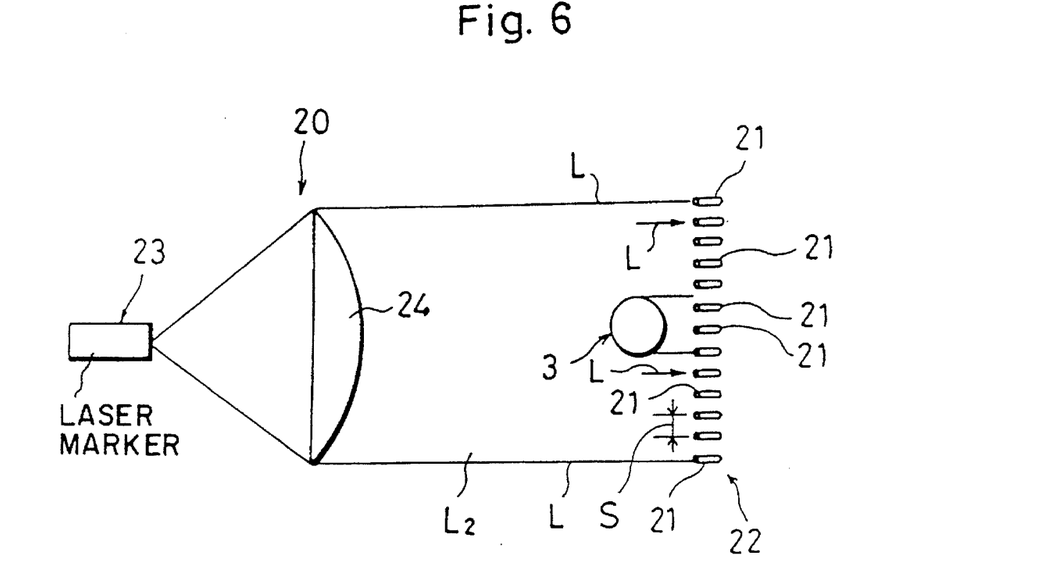
FIG. 6 is a schematic view of a principal portion of the measuring apparatus of the present invention according to a third preferred embodiment thereof.

FIG. 6 shows a different type measuring apparatus according to a third preferred embodiment of the present invention. This measuring apparatus is provided with a ray projecting means 20 which emits a parallel light band $L_2$, and a ray receiving means 22 which comprises a plurality of photosensors 21. As illustrated in FIG. 1, the amplifier portion 9, the instrumentation means 4, the interface 11, and the computer (calculating means) 5 are connected to this ray receiving means 22. On the other hand, the ray projecting means 20 is provided with the laser marker 23, and the convex lens 24. The ray of light emitted by means of the marker 23 is changed to the parallel light band $L_2$ through the convex lens 24, and is incident upon the photosensors 21. Thereafter, the parallel light band $L_2$ is ramified into a plurality of parallel rays L of light at the photosensors 21, and the plurality of parallel rays L of light are received by using the ray receiving means 22.

In order to ensure that the ray receiving means 22 are respectively allowed to receive one of the parallel rays of light, the photosensors 21 are desired to be respectively provided with a small-diameter cylinder type member for preventing an oblique incidence of a ray of light on them. In this case, the photosensors 21 are arranged on a plane of the parallel light band $L_2$ such that the distance S between every two neighboring photosensors 21 does not exceed the radius r of the flying spherical object 3. As a result, the measuring installation comprising the ray projecting means 20 and the ray receiving means 22 which are described in the preceding allows the flying spherical object to block off at least two rays L of light, whereby a wide measuring range is provided to facilitate the measurement of the flying velocity thereof.

The flying velocity of the golf ball in flight is measured through a silhouette thereof which is projected on a surface perpendicular to the optical axes of the rays L of light (i.e. the plane XZ). However, since the following equations can be obtained from FIG. 2, if the vertical launch angle $\theta_0$ of the golf ball, and the real lateral deviation angle (a horizontal launch angle) $\Phi_0$ thereof, are measured, the real flying velocity V of the golf ball can be given on a plane including the trajectory line thereof.

$$v = V \sqrt{\sin^2\theta + \cos^2\theta \cdot \cos^2\phi}.$$

$$V = \frac{v}{\sqrt{(\sin^2\theta + \cos^2\theta) + \cos^2\theta \cdot (\cos^2\phi - 1)}}$$

In the present invention, the spherical object has a circular sectional configuration and includes an object which can be regarded as having a sectional configuration. As a result, the measuring apparatus and the measuring method of the present invention which are described in the foregoing can measure the flying velocity of a spherical object in flight if this spherical object has a circular sectional configuration, or can be regarded as having a sectional configuration thereof.

The present invention is not limited in the application thereof to the preferred embodiments described in the foregoing. The measuring apparatus according to the present invention can be freely changed in the design thereof without departing from the scope of the present invention. For example, the parallel rays L of light emitted by using the ray projecting means 1 may be varied in the number, the intervals, and other conditions thereof as desired as long as a flying spherical object 3 crosses at least two rays L of light.

Moreover, the rays L of light may be at regular intervals or at irregular intervals. Also, if a flying spherical object crosses three or more rays L of light, the flying velocity thereof can be measured with higher accuracy. This is for the following reason.

In order to find the velocity of a flying golf ball, it is necessary to know the ray blockage length ("$2a_1$" in the equation earlier indicated in the foregoing for finding the velocity v of the flying golf ball). This length is given by finding the time for which two relative photodiodes 7 are shielded from the rays L of light. Therefore, if a flying spherical object crosses three or more rays L of light, it is feasible to learn the time for which three or more relative photodiodes 7 are shielded from the rays L of light, thereby allowing the velocity of the flying golf ball to be measured with higher accuracy.

Therefore, the measuring installation according to the present invention can widely and readily measure the velocity of a flying spherical object 3.

Moreover, the measuring installation according to the present invention is simple in the entire construction thereof, and can readily compute the flying velocity of a spherical object such as exemplified in the foregoing by using the arithmetic operation means 5.

We claim:

1. An apparatus for measuring the flying velocity of a spherical object in flight, comprising:

a ray projecting means for emitting a plurality of parallel rays of light which are located within a single plane, and in which each location is a known quantity, and the distance between every two neighboring rays of light is set such as to be less than the radius of said spherical object;

a ray receiving means for detecting the incidences of said rays of light and the interceptions of said rays of light;

an instrumentation means for measuring the time for which said rays of light are blocked off by said spherical object, upon detecting signals given by said ray receiving means;

and an arithmetic operation means for computing the flying velocity of said spherical object in flight on the basis of the locations of the rays of light which are blocked off, the dimensions of said spherical object and the interception time of said rays of light which is measured by using said instrumentation means.

2. The apparatus for measuring the flying velocity of a spherical object in flight, as set forth in claim 1, wherein the ray projecting means comprises:

a plurality of semiconductor type laser markers vertically arranged at predetermined intervals.

3. The apparatus for measuring the flying velocity of a spherical object in flight as set forth in claim 1, wherein the ray projecting means comprises:

a laser marker which radiates a semiconducting laser beam expanded in a fan-shaped configuration by means of a cylindrical lens;

a convex lens for converting the fan-shaped configuration of said semiconductor type laser beam to a parallel light band; and a masking plate containing a plurality of holes which are vertically arranged.

4. The apparatus for measuring the flying velocity of a spherical object in flight as set forth in claim 1, wherein the ray receiving means comprises a plurality of photodiodes vertically arranged at predetermined intervals.

5. The apparatus for measuring the flying velocity of a spherical object in flight as set forth in claim 1, wherein an amplifier portion is provided with an automatic gain control circuit and the ray receiving means comprises:

a plurality of photodiodes vertically arranged at predetermined intervals, the instrumentation means measures as the interception time of the rays of light the time for which the output of said amplifier portion is less than a specified value, and a detection is performed upon photodiodes shielded from the rays of light by the spherical object in flight.

6. The apparatus for measuring the flying velocity of a spherical object in flight as set forth in claim 1, wherein the ray receiving means comprises a plurality of photodiodes vertically arranged at predetermined intervals, and the calculating means comprises a computer in which the levels of the photodiodes, the distance between every two neighboring photodiodes, the radius of the spherical object, and the distance from the shot point of the spherical object to a single plane are inputted.

7. An apparatus for measuring the flying velocity of a spherical object in flight, comprising:

a ray projecting means for emitting a parallel light band;

ray receiving means adapted to admit said parallel light band in the form of a plurality of parallel rays of light, which means is arranged in a plane of said parallel light band, and in which each position is a known quantity, and the distance between every two neighboring ray receiving means is set such as to be less than the radius of said spherical object;

an instrumentation means for receiving detecting signals from the ray receiving means, to thereby measure the time for which said rays of light are blocked off by said spherical object;

an arithmetic operation means for computing the flying velocity of said spherical object in flight on the basis of the locations of the rays of light which are blocked off, the dimensions of said spherical object and the interception time of said rays of light which is measured by using said instrumentation means.

8. The apparatus for measuring the flying velocity of a spherical object in flight as set forth in claim 7, wherein the ray projecting means comprises:

a laser marker; and a convex lens for changing a laser beam emitted by the laser marker into a parallel light band.

9. The apparatus for measuring the flying velocity of a spherical object in flight as set forth in claim 7, wherein the ray receiving means comprises a plurality of optical sensors vertically arranged at predetermined intervals.

10. The apparatus for measuring the flying velocity of a spherical object in flight as set forth in claim 7, wherein an amplifier portion is provided with an automatic gain control circuit, the ray receiving means comprising:

a plurality of optical sensor means vertically arranged at predetermined intervals, wherein the instrumentation means measures as the interception time of the rays of light the time for which the output of said amplifier portion is less than a specified value, and a detection is performed upon the optical sensor means shielded from the rays of light by the spherical object in flight.

11. The apparatus for measuring the flying velocity of a spherical object in flight as set forth in claim 7, wherein the ray receiving means comprises:

a plurality of optical sensor means vertically arranged at predetermined intervals, and the arithmetic operation means is a computer in which the levels of the optical sensor means, the distance between every two neighboring optical sensor means, the radius of the spherical object, and the distance from the shot point of the spherical object to the parallel light band are inputted.

12. The apparatus for measuring the flying velocity of a spherical object in flight as set forth in claim 1 or claim 7, wherein the spherical object is a golf ball.

13. The apparatus for measuring the flying velocity of a spherical object in flight as set forth in claim 1 or claim 7, wherein the spherical object is a tennis ball.

14. A method for measuring the flying velocity of a spherical object, comprising the steps of:

detecting the passage of the spherical object which blocks off at least two parallel rays of light in a single plane whose distances and positions from the shot point of the spherical object are known quantities;

measuring the interception time of each of the two rays of light which is blocked in said plane; and computing the flying velocity of said spherical object on the basis of the dimensions of the spherical object and the measured value of the interception time of each ray of light.

15. The method for measuring the flying velocity of a spherical object as set forth in claim 14, wherein said spherical object is a golf ball.

16. The method for measuring the flying velocity of a spherical object as set forth in claim 14, wherein said spherical object is a tennis ball.

* * * * *